US011125877B2

(12) United States Patent
McGill (10) Patent No.: US 11,125,877 B2
(45) Date of Patent: Sep. 21, 2021

(54) MULTI-DIRECTIONAL LASER LEVEL

(71) Applicant: Bryan Jayvon McGill, Caseyville, IL (US)

(72) Inventor: Bryan Jayvon McGill, Caseyville, IL (US)

(*) Notice: Subject to any disclaimer, the term of this patent is extended or adjusted under 35 U.S.C. 154(b) by 0 days.

(21) Appl. No.: 16/661,668

(22) Filed: Oct. 23, 2019

(65) Prior Publication Data

US 2020/0132838 A1 Apr. 30, 2020

Related U.S. Application Data

(60) Provisional application No. 62/749,734, filed on Oct. 24, 2018.

(51) Int. Cl.
| | | |
|---|---|---|
| *G01B 11/14* | (2006.01) | |
| *G01S 17/08* | (2006.01) | |
| *G01C 15/00* | (2006.01) | |
| *G01C 9/00* | (2006.01) | |
| *G01S 17/88* | (2006.01) | |

(52) U.S. Cl.
CPC .............. *G01S 17/08* (2013.01); *G01C 9/00* (2013.01); *G01C 15/004* (2013.01); *G01C 15/008* (2013.01); *G01S 17/88* (2013.01)

(58) Field of Classification Search
CPC .......... G01S 17/08; G01S 17/88; G01C 9/00; G01C 15/004; G01C 15/008
See application file for complete search history.

(56) References Cited

U.S. PATENT DOCUMENTS

| | | | | |
|---|---|---|---|---|
| 3,897,637 | A * | 8/1975 | Genho | G01C 15/004 33/227 |
| 4,973,158 | A | 11/1990 | Marsh | |
| 5,743,902 | A * | 4/1998 | Trost | A61B 18/203 606/11 |
| 5,836,081 | A | 11/1998 | Orosz, Jr. | |
| 5,872,657 | A * | 2/1999 | Rando | G01C 15/004 359/629 |
| 6,947,820 | B2 * | 9/2005 | Ohtomo | G01C 15/004 172/4.5 |

(Continued)

FOREIGN PATENT DOCUMENTS

| | | | |
|---|---|---|---|
| JP | 08-226820 A | 9/1996 | |
| KR | 10-1682518 B1 | 12/2016 | |
| WO | WO-2020086720 A1 * | 4/2020 | ............ G01S 17/08 |

OTHER PUBLICATIONS

International Search Report and Written Opinion issued for PCT/US2019/057666 dated Feb. 10, 2020, 8 pages.

*Primary Examiner* — Peter B Kim (74) *Attorney, Agent, or Firm* — Lewis Rice LLC (57) ABSTRACT

A system for indicating points equidistant from a line is provided, as well as devices and methods of doing the same. The system may include a housing; and a laser supported by the housing, the laser being configured to emit laser light from the housing in both a first direction and an opposing second direction; wherein the emitted light in the first direction is configured to include an indicator and the emitted light in the second direction is configured to include a corresponding indicator, and wherein the indicator and the corresponding indicator are configured to be projected onto the surface at about the same distances from the point on the surface.

17 Claims, 4 Drawing Sheets

(56) References Cited

U.S. PATENT DOCUMENTS

| | | | | |
|---|---|---|---|---|
| 8,876,295 B2* | 11/2014 | Scanlon | ............... | G09F 21/10 |
| | | | | 353/13 |
| 9,239,227 B1* | 1/2016 | Lin | ............... | G01C 15/002 |
| 9,518,823 B2 | 12/2016 | Hill | | |
| 2005/0005462 A1* | 1/2005 | Heger | ............... | G01C 15/00 |
| | | | | 33/286 |
| 2014/0352161 A1* | 12/2014 | Ranieri | ............... | G01C 15/004 |
| | | | | 33/291 |
| 2019/0063921 A1* | 2/2019 | George | ............... | G01C 3/06 |

* cited by examiner

MULTI-DIRECTIONAL LASER LEVEL

CROSS-REFERENCE TO RELATED APPLICATION(S)

This application claims the benefit of United States Provisional Patent Application Ser. No. 62/749,734, filed Oct. 24, 2018. The entire disclosure of the above document is herein incorporated by reference.

BACKGROUND

1. Field of the Invention

This disclosure is related to the field of laser devices, and more specifically to a laser level system that may assist the user in determining the distances between objects on a surface, such as a wall or other barrier.

2. Description of the Related Art

Levels have been used in a variety of industries to indicate whether a surface is horizontal or vertical. There are many different types of levels, including spirit levels, plum-bob levels, and similar devices, all of which assist a user in determining if a surface is horizontal or vertical. These types of devices may be used by carpenters, stonemasons, brick layers, other building trade workers, surveyors, millwrights, metal workers, photographers, scientists, interior designers, and home owners. More recently, some of these professions have begun using laser levels to assist with determining if a surface is horizontal or vertical. For example, laser levels are often used to assist with the hanging of multiple picture frames at the same line along a wall.

Laser levels are typically used more like a square or a straight edge than a level. For example, laser levels are often used to project a straight line that may serve as a reference for the easy placement of nails on a wall. Such laser levels have, for example, been described in U.S. Pat. Nos. 3,897,637, 4,973,158, 5,836,081, and 9,518,823, the entire disclosures of which are herein incorporated by reference. A user may simply project a straight beam across the wall using the laser level, enabling the user to place nails at regular intervals along that beam or line for the hanging of picture frames. A laser level may also be used for the easy alignment of multiple hanging picture frames. To do so, a user sets the laser level so that it projects a straight beam across the wall relative to the picture frames. For example, the user may be able to set the laser level so that the straight laser line is horizontally level across the upper border of one or more of the picture frames. The user may then use the beam as a straight, level reference when adjusting the picture frames on the wall. In each case, the laser level may be used to project a plane of light onto surfaces to be used as a reference for use in, for example, hanging picture frames.

A typical laser level is a tool that may be affixed to a wall, set on the ground, or mounted onto a support structure, such as a tripod or other pedestal, and that typically includes a laser beam projector that projects a fixed beam of laser light. The projected laser beam, which is visible to the user, may then be used as a reference to determine a horizontal, vertical, or otherwise collinear line wherever the laser beam is shown on a surface. In projecting the laser beam, a laser level may project a plane onto the surface, or, said differently, where the projected plane would meet that surface. This projected plane may then be used like a square or other device used to determine a straight line on surfaces.

In the construction and interior design industries, laser levels are often used to project a horizontal line on a wall so that the user can place or mount other objects on the wall at a uniform height. Alternatively, the laser level may project a vertical line or both horizontal and vertical lines. In order to do so, typically the user places the laser level on the ground, a raised surface, or a mounting structure, such as a tripod or other pedestal. In these cases, the laser level may be remote from the wall onto which the laser beam is projected. This is how most laser levels are used. In other cases, the user may affix the laser level to the wall. In each case, the user will turn on the laser level and observe the laser light projected by the laser level onto the wall. This laser light may often be in the form of a line that extends from each corner of the wall. The laser light is visible to the user, and the user can easily use this line as a reference point when hanging pictures or the like. Alternatively, the user may place tape on the wall in place of the laser line, so that the laser level may be turned off while keeping the line present. Further, the projected beam may be used as a constant reference to determine relative distances of multiple objects from that constant reference. In this way, the projected beam acts like a continuous, visible plane of reference. This is useful, for example, when hanging multiple pictures or objects on a wall at different or staggered heights.

Although laser levels may reliably project a straight plane, hanging picture frames often requires more information. For example, as user may desire to hang multiple pictures on the same wall at equal horizontal distances from each other. Further, a user may desire to hang the picture frames centered on the wall or about the center of the wall. In other instances, the user may desire to center an object relative to another object, for example, centering a mirror relative to a nearby sink or vanity. In order to accomplish such tasks, a user often has to use other devices, such as a tape measure in addition to the laser level. In using a tape measure, the user may need to measure in advance of hanging and mark the wall where needed. Further, this process and the calculations needed to determine where along the plane line each picture frame should be hung may be difficult for some users.

Laser levels sometimes include additional features intended to assist with the organized placement of objects on a wall, which features provide the user with additional information. For example, some laser levels include a tape measure. The tape measure may be used to determine the distance of the laser level from an adjacent object, such as an adjacent wall. While this addition may be convenient in some circumstances, the combination of a laser level and a tape measure has some drawbacks. For example, a tape measure incorporated into laser levels that are intended to be used remotely from a wall cannot be used to determine distances between objects on that wall. As another example, a laser level with a tape measure often includes a tape measure only on one side of the laser level. This limits the laser level and tape measure combination's ability to determine a distance from the laser level by only providing the distance measuring capability on one side of the laser level. Further, the use of a tape measure requires the user to interact with the laser level to unravel the tape, increasing the possibly of disturbing the laser level and its ability to project a statically placed laser beam. Moreover, the process of using and measuring with a tape measure can be time consuming and unwieldy. For example, if the laser level is mounted in a difficult to access position, it will be difficult to use an integrated tape measure. As discussed, some users may find the calculations required difficult to complete. Further, in some circumstances it is not desirable to leave marks for the calculations on the wall, which is the process required when using a tape measure. Additionally, it can be difficult to adjust the tape measure if interim measurements are desired. Moreover, when only one tape measure is provided, it may be difficult to center the laser level on a wall because only one side may be measured at a given time.

SUMMARY OF THE INVENTION

The following is a summary of the invention, which should provide to the reader a basic understanding of some aspects of the invention. This summary is not intended to identify critical elements of the invention or in any way to delineate the scope of the invention. The sole purpose of this summary is to present in simplified text some aspects of the invention as a prelude to the more detailed description presented below.

Because of these and other problems in the art, described herein, among other things, is a laser level system that may provide for both the projection of a substantially straight laser beam in addition to the easy determination of the distances between any side of the laser level and the nearest adjacent surface or obstruction, such as an adjacent wall or picture frame. This laser level system may also provide an easily readable output format for the distances of the laser level to adjacent surfaces or to other objects that may block the path of the beam. In another embodiment, the laser level system may be able to project a laser beam that includes marks that assist with the determination of distances. Each embodiment of the laser level design may increase the ability of a user to produce a straight line and to determine relative distances along the straight line.

Described herein, among other things is system for indicating points equidistant from a point on a surface, the system comprising: a housing; and a laser supported by the housing, the laser being configured to emit laser light from the housing in both a first direction and an opposing second direction; wherein the emitted light in the first direction is configured to include an indicator and the emitted light in the second direction is configured to include a corresponding indicator, and wherein the indicator and the corresponding indicator are configured to be projected onto the surface at about the same distances from the point on the surface.

In an embodiment of the system, the emitted light in the first direction includes a line and the indicator includes a break in the line, and the emitted light in the second direction includes a corresponding line and the corresponding indicator includes a break in the corresponding line.

In an embodiment of the system, the emitted light in s the aid first direction includes a line and the indicator includes a bar that extends in a direction that is perpendicular to the line, and the emitted light in the second direction includes a corresponding line and the corresponding indicator includes a corresponding bar that extends in a direction that is perpendicular to the corresponding line.

In an embodiment of the system, the system may be mounted onto the surface.

In an embodiment of the system, the system may be mounted onto a pedestal.

In an embodiment of the system, the system further comprises a measuring system and a display, the measuring system being configured to emit measuring laser light from the housing, detect reflections of the emitted measuring laser light, and cause the display to indicate a distance between the housing and a source of the reflections of the emitted measuring laser light.

In an embodiment of the system, the system is capable of measuring distances in two orthogonal directions.

In an embodiment of the system, the system is capable of measuring distances in three orthogonal directions.

In an embodiment of the system, the laser is configured to emit laser light from the housing in both a third direction and an opposing fourth direction, and wherein the third direction and the fourth direction are perpendicular to the first direction and the second direction.

In an embodiment of the system, the system further comprises a mirror, wherein the mirror may be adjusted to alter the indicator and the corresponding indicator.

There is also described herein, in an embodiment, a method for determining points equidistant from a point on a surface, the method comprising: providing a housing; and providing a laser supported by the housing, the laser being configured to emit laser light from the housing in both a first direction and an opposing second direction; wherein the emitted light in the first direction is configured to include an indicator and the emitted light in the second direction is configured to include a corresponding indicator, and wherein the indicator and the corresponding indicator are configured to be projected onto the surface at about the same distances from the point on the surface.

In an embodiment of the method, the emitted light in the first direction includes a line and the indicator includes a break in the line, and wherein the emitted light in the second direction includes a corresponding line and the corresponding indicator includes a break in the corresponding line.

In an embodiment of the method, the emitted light in the first direction includes a line and the indicator includes a bar that extends in a direction that is perpendicular to the line, and wherein the emitted light in the second direction includes a corresponding line and the corresponding indicator includes a corresponding bar that extends in a direction that is perpendicular to the corresponding line.

In an embodiment of the method, the method further comprises a step of mounting the housing onto the surface.

In an embodiment of the method, the method further comprises a step of mounting the housing onto a pedestal.

In an embodiment of the method, the method further comprises a step of providing a measuring system and a display, the measuring system being configured to emit measuring laser light from the housing, detect reflections of the emitted measuring laser light, and cause the display to indicate a distance between the housing and a source of the reflections of the emitted measuring laser light.

In an embodiment of the method, the method further comprises a step of measuring distances in two orthogonal directions.

In an embodiment of the method, the method further comprises a step of measuring distances in three orthogonal directions.

In an embodiment of the method, the laser is configured to emit laser light from the housing in both a third direction and an opposing fourth direction, and wherein the third direction and the fourth direction are perpendicular to the first direction and the second direction.

In an embodiment of the method, the method further comprises a mirror, wherein the mirror may be adjusted to alter the indicator and the corresponding indicator.

DETAILED DESCRIPTION OF THE PREFERRED EMBODIMENT(S)

The following detailed description and disclosure illustrates by way of example and not by way of limitation. This description will enable one skilled in the art to make and use the disclosed structures and methods, and describes several embodiments, adaptations, variations, alternatives, and uses of the disclosed structures and methods. As various changes could be made in the above constructions without departing from the scope of the disclosures, it is intended that all matter contained in the description or shown in the accompanying drawings shall be interpreted as illustrative and not in a limiting sense.

Figure 1:
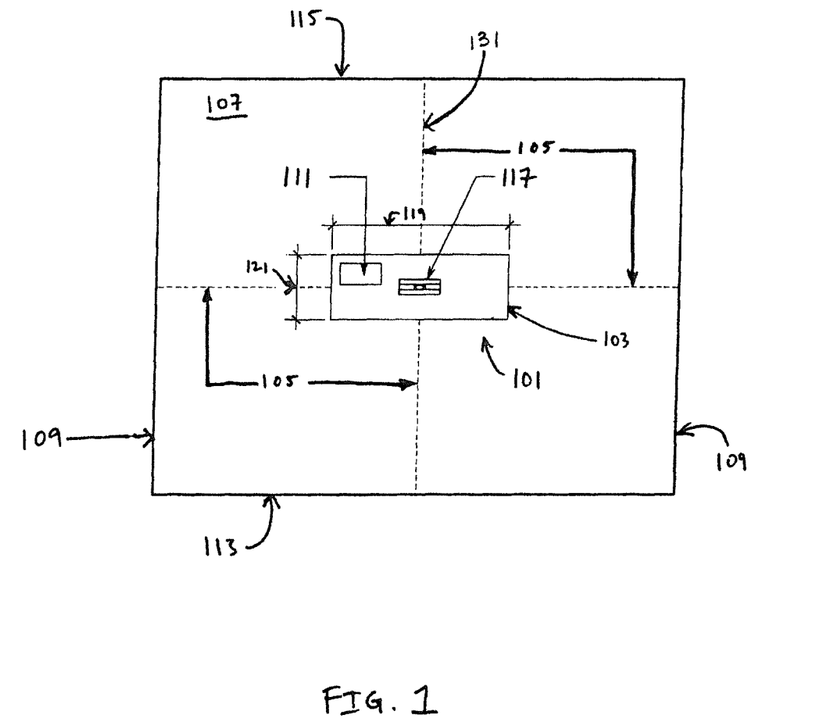
FIG. 1 provides a view of an embodiment of a laser level.

FIG. 1 provides an embodiment of a laser level (101). Laser level (101) includes a laser level housing (103) that at least partially surrounds and protects the interior systems of laser level (101), known in the art, that allow laser level (101) to project a generally straight laser beam (105) from laser level housing (103). Laser level (101) may include a level bubble (117), which bubble may be useful in confirming if laser level housing (103) is mounted or positioned in a level position, or other position that would allow for the projection of a level or otherwise oriented laser beam. Laser level housing (103) may be generally a rectangular prism in shape, having known height, length, and depth measurements. In any case, the shape of laser level (101) may be formed into any shape. Laser level housing (103) may be formed of any material known in the art, as long as the material provides sufficient structure to protect the internal components and resist deformation that may compromise the ability of laser level (101) to provide laser beams (105) or accurate measurements. For example, laser level housing (103) may be made from a suitable plastic or metal material, or a combination of these or other materials.

Figure 2:
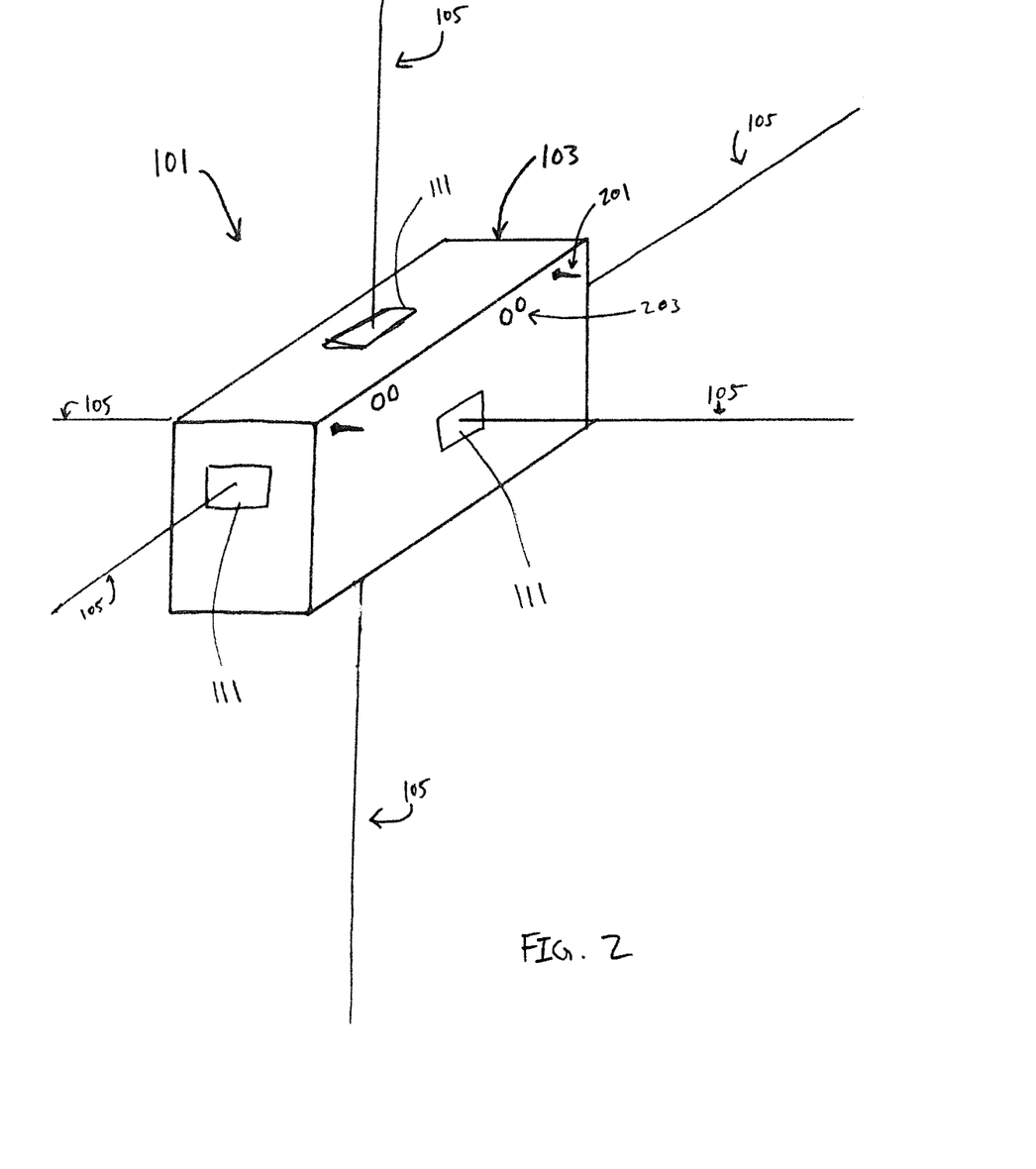
FIG. 2 provides a perspective view of an embodiment of a laser level.
Figure 3:
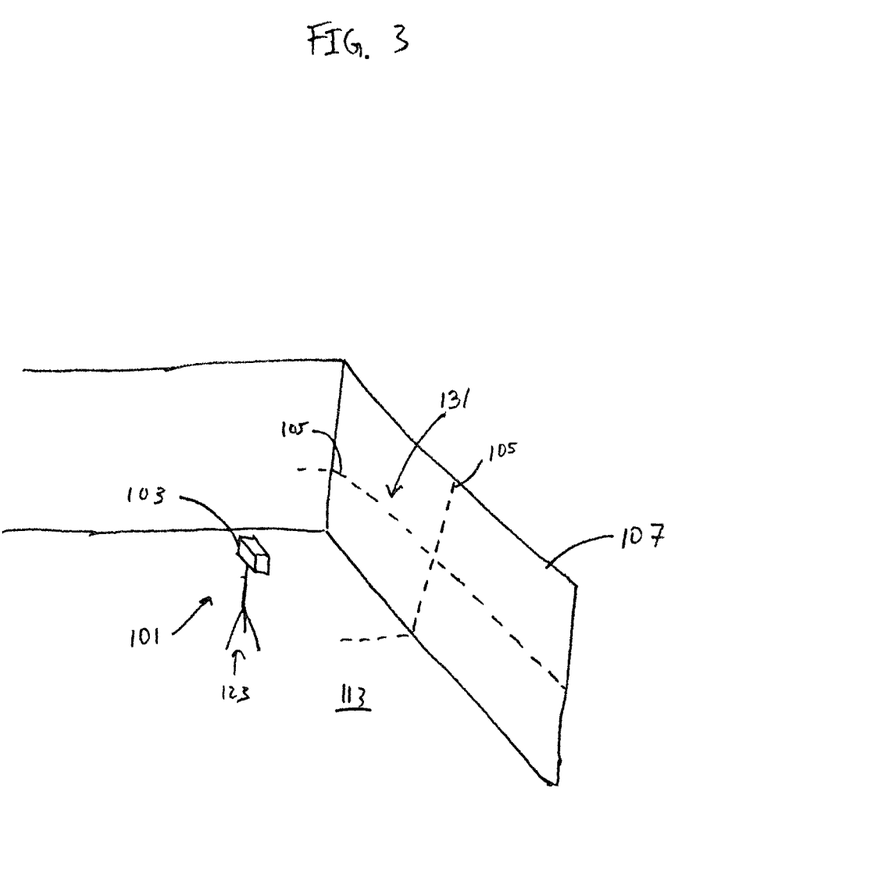
FIG. 3 shows a view of a perspective view of another embodiment of a laser level.

As shown in FIG. 2, laser level housing (103) may include at least one of a plurality of means for attaching laser level (101) to a surface or to a fixing structure, such as a tripod (123) (see FIG. 3). For example, in one embodiment of laser level (101), laser level housing (103) includes small projections (201) that may be used to mount laser level (101) onto a wall (107). Projections (201) may be movable or may be fixed. In another embodiment, as shown in FIG. 2, laser level housing (103) may include a plurality of surface features (203) that allow laser level housing (103) to be hung on a projection from wall (107), such as a nail projecting from wall (107). In another embodiment, laser level housing (103) may include a threaded fixture for attaching to tripod (123) or other fixing structure (see FIG. 3). In another embodiment, laser level housing (103) may include features that allow laser level housing (103) to otherwise be mounted onto wall (107) or other fixing structure. In any case, laser level housing (103) may include any combination of the above attaching means, as well as any other attaching means known in the art.

As shown in FIGS. 1 and 2, laser level (101) is capable of projecting at least one laser beam (105), which may extend from laser level housing (103) in a generally straight direction. Laser level (101) may be capable of projecting laser beam (105) in multiple directions. In an embodiment, the laser level (101) is capable of projecting two laser beams (105) in opposite directions about the generally horizontal direction. Laser beams (105) may be separately generated, may be a single laser beam (105) split into two opposite ("opposing") directions, or may be produced by any other means known in the art. Laser level (101) may be capable of projecting laser beams (105) in two generally orthogonal directions, for example, in both the generally vertical and horizontal directions. Further, laser level (101) may be capable of projecting laser beams (105) in three orthogonal directions, as shown, for example, in FIG. 2. Laser beams (105) may project from laser level housing (103) at a plurality of points, each of which may include a window (111) within laser level housing (103) that is transparent to laser beam (105) light. In another embodiment, laser beam or beams (105) may be projected from a single window (111) or other feature of laser level housing (103).

In an embodiment, the laser level housing (103) may house laser producing elements (133), which are known in the art. Such laser producing elements (133) are discussed in the previously mentioned patents, U.S. Pat. Nos. 3,897,637, 4,973,158, 5,836,081, and 9,518,823, the entire disclosures of which are herein incorporated by reference. The laser producing elements (133) may produce the desired laser beams (105) through any means known in the art, such as by spreading a collimated beam from a laser producing element (133) using fans, mirrors (135), prisms, or other devices. Any means of producing a laser beam (105) that may spread across wall (107) may be used.

In an alternative embodiment, laser level (101) may be intended to be used remotely to wall (107), as shown in FIG. 3. In the depicted embodiment, laser level (101) may be mounted on a floor (113), a surface raised from floor (113), or a mounting structure, such as tripod (123). Laser level (101) emits one or more laser beams (105) onto wall (107) by projecting laser beams (105) forward of laser level housing (103). Laser beams (105) are then visible on wall (107) for use by the user. Laser beams (105) may be used as a reference, for example, when hanging picture frames on wall (107).

FIGS. 1-3 show that laser level (101) may project multiple laser beams (105) generally simultaneously. For example, in an embodiment, laser level (101) may project laser beams (105) generally horizontally such that it extends until obstructed by, for example, adjacent wall (109). Laser beams (105) may continue onto adjacent wall (109) or otherwise onto any other adjacent surface or object. Laser beams (105) may form lines on wall (107), as shown, for use by the operator of laser level (101). Additionally, laser level (101) may project laser beams (105) generally vertically that may extend to and/or beyond, for example, a ceiling (115) and floor (113) of the room. Accordingly, laser level (101) may project laser beams (105) that are generally parallel or orthogonal. In one embodiment, laser level (101) may project laser beams (105) in directions that are neither parallel nor orthogonal. In another embodiment, the directions in which laser beams (105) project from laser level (101) may be adjustable. In another embodiment, laser level (101) may be configurable to project any combination of laser beams (105).

Regardless of the embodiment of laser level housing (103) or configuration as showing in FIGS. 1-3, laser level (101) will generally project a laser beam (105) that includes marks generally corresponding to units of distance. For example, as shown in FIGS. 1 and 3, laser beam (105) may include a plurality of gaps in the beam projected onto wall (107). Laser beam (105) in this embodiment will resemble a line of dashes projected onto an adjacent surface, such as wall (107). These dashes, or the gaps in between the dashes, may correspond to consistent units of measure, for example, inch-long increments. The consistent unit of measure may be other increments, such as centimeters, feet, yards, and/or other units of measure. More than a single unit of measure may be provided. In this case, relative distances from laser level (101) are easily determined by a user's visual inspection of laser beam (105). Alternatively, the units of measure may not be related to a specific unit of measure, but instead, consistent in their spacing such that relative distances may be easily determined.

The units of measure may include a plurality of indicators (131), such as a larger line projected at every foot along laser beam (105). In some embodiments, indicators (131) may be the above described dashes or the gaps in between the dashes. In other embodiments, indicators (131) may be, as discussed below, perpendicular bars or dots. Such indicators (131) may intersect, flank, or otherwise be associated with laser beam (105). In yet other embodiments, indicators (131) may be symbols that appear as a shape (any known shape); as two lines intersecting at any angle, including at right angles; or as any other shape or symbol known to persons or ordinary skill in the art. In any embodiments, indicators (131) may be present along with a line, or alternatively, may be displayed without any accompanying line.

In order to retain consistency, the laser level (101) may use range finding to alter the shapes of the lines, dashes, and/or indicators (131) based on the distance a given portion of projected laser beam (105) is from laser level housing (103). Such range finding may be automatic or manual. The shapes of the lines, dashes, and/or indicators (131) may be altered, for example, by adjusting a mirror or mirrors (135) used to project laser beam (105). Such alteration of the lines, dashes, and/or indicators (131), may be accomplished by a user's hand or automatically by the system.

In another embodiment, the units of measure may be varied along the laser beams (105). In such an embodiment, when laser level housing (103) projects two laser beams (105) in opposite directions, each dash or indicator (131) in the first direction may have a corresponding dash or indicator (131) of the same size or positioning in the second direction even if consecutive dashes or indicators (131) in either of the directions are of non-corresponding size. Further, the units of measure may be displayed along laser beam (105) by any means known in the art. In another embodiment, the units of measure may be displayed using indicators (131), such as perpendicular bars or dots larger than the majority of laser beam (105). In another embodiment, the units of measure may be displayed using a thinner or thicker portion of laser beam (105), or other marker, such as an absence of laser beam (105). In each case, laser beam (105) may include visible units of measure.

In an embodiment, laser level housing (103) may include a readout display (111) that allows a user to read the relative distances between laser level housing (101) and an adjacent surface, such as wall (109), floor (113), or ceiling (115). In such an embodiment, laser level (101) may include additional hardware, such as a laser range finder, known in the art, to determine the necessary distances. In other embodiments, laser level (101) may use laser beams (105) for determining distances. Laser level (101) may provide multiple measurements at any given time including, for example, the relative distances between laser level (101) and adjacent walls (109), as well as the distances between laser level (101) and floor (113) and ceiling (115). In displaying the above distances, laser level (101) may take into account the relative dimensions (119, 121) of laser level housing (103) itself such that the distance from a center point of laser level (101) may be determined.

In an embodiment where laser level (101) is mounted on wall (107), laser level (101) may project four laser beams (105): one to each adjacent wall (109); one to ceiling (115); and one to floor (113). In addition, laser level (101) may display the distances from laser level (101) to each wall (109), ceiling (115), and floor (113). Accordingly, a user may determine the size and shape of wall (107) on which laser level (101) is mounted. To find the dimensions of wall (107), the user may place laser level (101) at any arbitrary position on wall (107). For example, a user may place laser level (101) near the center of wall (107). Further, the user may rotate laser level (101) slowly. Laser level (101) may determine the distances to surrounding walls (109), floor (113), and ceiling (115) while rotating by sampling measurements at appropriate intervals. This way, if the laser level is placed at first in a position that is not generally orthogonal to walls (109), floor (113), and ceiling (115), the lowest measurements recorded when laser level (101) is rotated will represent the generally orthogonal distance, and will be the best determiners of the size of wall (107). In this embodiment, laser level (101) is capable of recording multiple measurements in each direction and reporting the lowest measurements recorded. In other embodiments, laser level (101) may determine what level is and/or determine what is vertical or horizontal and automatically make adjustments or instruct the user on how to adjust the laser level (101). In yet other embodiments, laser level (101) may rely on the user to properly align laser level (101) so that laser beams (105) are level or otherwise oriented.

In an embodiment, laser level (101) may be used to determine the size of an entire room that is shaped like a rectangular prism. In this embodiment, laser level (101) may project six laser beams (105) or a single laser beam (105) in six directions: one to each of four adjacent walls (109); one to ceiling (115); and one to floor (113). In addition, laser level (101) may display the distances from laser level (101) to each wall (109), ceiling (115), and floor (113). Accordingly, a user may determine the size and shape of the room in which laser level (101) is placed. To find the dimensions of the relevant room, the user may place laser level (101) at any arbitrary position in the room. For example, a user may place laser level (101) near the center of the room on floor (113). Further, the user may rotate laser level (101) slowly. Laser level (101) may determine the distances to the surrounding walls (109) while rotating by sampling measurements at appropriate intervals. This way, if the laser level is placed at first in a position that is not generally orthogonal to walls (109), the lowest measurements recorded when laser level (101) is rotated will represent the generally orthogonal distance, and will be the best determiners of the size of the room. In this embodiment, laser level (101) is capable of recording multiple measurements in each direction and reporting the lowest measurements recorded. Similar to the discussion above, laser level (101) may be oriented to level manually or automatically, and in either case, using any method known in the art.

Figure 4:
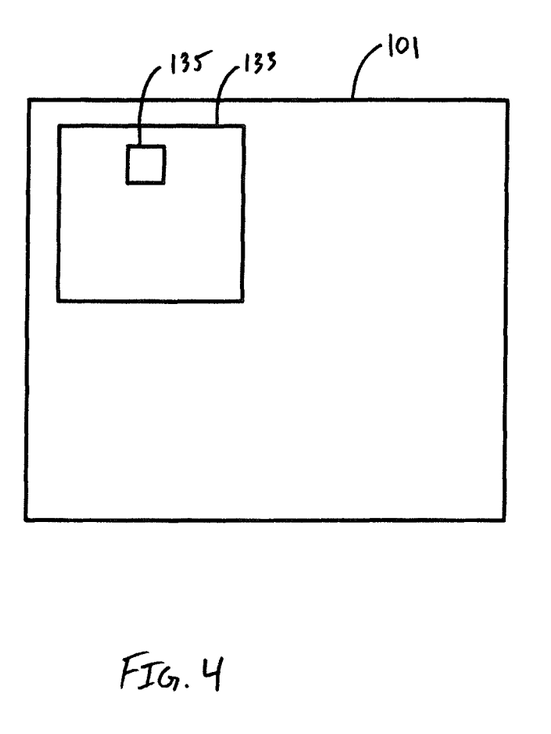
FIG. 4 shows a block diagram of some components comprising an embodiment of a laser level.

FIG. 4 shows a block diagram of some components comprising an embodiment of a laser level. As depicted in FIG. 4, laser level (101) may include laser producing elements (133), which may include a mirror (135).

The qualifier "generally," and similar qualifiers as used in the present case, would be understood by one of ordinary skill in the art to accommodate recognizable attempts to conform a device to the qualified term, which may nevertheless fall short of doing so. This is because terms such as "orthogonal" are purely geometric constructs and no real-world component or relationship is truly "orthogonal" in the geometric sense. Variations from geometric and mathematical descriptions are unavoidable due to, among other things, manufacturing tolerances resulting in shape variations, defects and imperfections, non-uniform thermal expansion, and natural wear. Moreover, there exists for every object a level of magnification at which geometric and mathematical descriptors fail due to the nature of matter. One of ordinary skill would thus understand the term "generally" and relationships contemplated herein regardless of the inclusion of such qualifiers to include a range of variations from the literal geometric meaning of the term in view of these and other considerations.

While the invention has been disclosed in conjunction with a description of certain embodiments, including those that are currently believed to be the preferred embodiments, the detailed description is intended to be illustrative and should not be understood to limit the scope of the present disclosure. As would be understood by one of ordinary skill in the art, embodiments other than those described in detail herein are encompassed by the present invention. Modifications and variations of the described embodiments may be made without departing from the spirit and scope of the invention.

It will further be understood that any of the ranges, values, properties, or characteristics given for any single component of the present disclosure can be used interchangeably with any ranges, values, properties, or characteristics given for any of the other components of the disclosure, where compatible, to form an embodiment having defined values for each of the components, as given herein throughout. Further, ranges provided for a genus or a category can also be applied to species within the genus or members of the category unless otherwise noted.

The invention claimed is:

1. A system for indicating points equidistant from a point on a surface, the system comprising: a housing:
   a measuring system:
   a display; and
   a laser supported by said housing, said laser being configured to emit laser light from said housing wherein said emitted light forms a first light line that, when projected on a surface, extends in both a first direction and an opposing second direction from a point on said surface;
   wherein said first light line in said first direction is configured to include an indicator and at least a first segment and said first, light, line in said second direction is configured to include a corresponding indicator and at least, a second segment,
   wherein said first segment and said second segment are illuminated portions of said first light line, each of said first segment and said second segment having a length equal to a first length,
   wherein said indicator is a break having a second length in said first light in said first direction, and wherein said corresponding indicator is a break having said second length in said first light in said, direction,
   wherein said indicator and said corresponding indicator are configured to be projected onto said surface at about the same distances from said point on said surface, wherein said first length is greater than said second length, and wherein said measuring system is configured to emit measuring laser light from said housing, detect reflections of said emitted measuring laser light, and cause said display to indicate a distance between said housing and a source of said reflections of said emitted measuring laser light.

2. The system of claim 1, wherein said system may be mounted onto said surface.

3. The system of claim 1, wherein said system may be mounted onto a pedestal.

4. The system of claim 1, wherein said system is capable of measuring distances in two orthogonal directions.

5. The system of claim 1, wherein said system is capable of measuring distances in three orthogonal directions.

6. The system of claim 1, wherein said laser is configured to emit laser light from said housing wherein said emitted light forms a second light line that extends on said surface in both a third direction and an opposing fourth direction from said point, and wherein said second light line is perpendicular to said first light line.

7. The system of claim 1, further comprising a mirror, wherein said mirror may be adjusted to alter said indicator and said corresponding indicator.

8. The system of claim 1, wherein said first light line in said first direction is further configured to include a third segment and said first light line in said second direction is further configured to include a fourth segment, and
   wherein said third segment and said fourth segment each have a length equal to a third length.

9. The system of claim 8, wherein said first length is equal to said third length.

10. The system of claim 8, wherein said first length is not equal to said third length.

11. A method for indicating points equidistant from a point on a surface, the method comprising:
    providing a housing;
    providing a measuring system;
    providing a display; and
    providing a laser supported by said housing, said laser being configured to emit laser light from said housing wherein said emitted light forms a first light line that, when projected on a surface, extends in both a first direction and an opposing second direction;
    wherein said emitted light in said first direction is configured to include an indicator and at least a first segment and said first light line in said second direction is configured to include a corresponding indicator and at least a second segment,
    wherein said first segment and said second segment are illuminated portions of said first light line, each of said first segment and said second segment having a length equal to a first length,
    wherein said indicator is a break having a second length in said first light line in said first direction, and wherein said corresponding indicator is a break having said second length in said first light line in said second direction,
    wherein said indicator and said corresponding indicator are configured to be projected onto said surface at about the same distances from said point on said surface,
    wherein said first length is greater than said second length, and
    wherein said measuring system is configured to emit measuring laser light from said housing, detect reflections of said emitted measuring laser light, and cause said display to indicate a distance between said housing and a source of said reflections of said emitted measuring laser light.

12. The method of claim 11, further comprising a step of mounting said housing onto said surface.

13. The method of claim 11, further comprising a step of mounting said housing onto a pedestal.

14. The method of claim 11, further comprising a step of measuring distances in two orthogonal directions.

15. The method of claim 11, further comprising a step of measuring distances in three orthogonal directions.

16. The method of claim 11, wherein said laser is configured to emit laser light from said housing wherein said emitted light forms a second light line that extends in both a third direction and an opposing fourth direction, and wherein said second light line is perpendicular to said first light line.

17. The system of claim 11, a mirror, where said mirror may be adjusted to alter said indicator and said corresponding indicator.

* * * * *